United States Patent [19]

Yokota et al.

[11] Patent Number: 5,332,854
[45] Date of Patent: Jul. 26, 1994

[54] SURFACTANT

[75] Inventors: Kinya Yokota, Shiga; Akinobu Ichihara; Hitoshi Shinike, both of Kyoto, all of Japan

[73] Assignee: Dai-Ichi Kogyo Seiyaku Co., Ltd., Kyoto, Japan

[21] Appl. No.: 98,010

[22] Filed: Jul. 26, 1993

Related U.S. Application Data

[63] Continuation of Ser. No. 715,946, Jun. 14, 1991, abandoned.

[30] Foreign Application Priority Data

Jun. 20, 1990 [JP] Japan ................. 2-162287

[51] Int. Cl.$^5$ ............................................. C07C 305/12
[52] U.S. Cl. ............................................. 558/33
[58] Field of Search ................................. 558/33, 34

[56] References Cited

U.S. PATENT DOCUMENTS 4,918,211  4/1990  Yokota et al. ..................... 558/33

*Primary Examiner*—Nicky Chan
*Attorney, Agent, or Firm*—Jordan and Hamburg

[57] ABSTRACT

The surfactant of this invention is a compound of general formula (I)

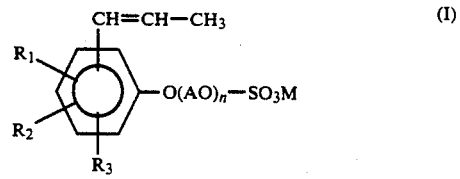

wherein $R_1$ is an alkyl, alkenyl or aralkyl group containing 6 to 18 carbon atoms; $R_2$ is a hydrogen atom or an alkyl, alkenyl or aralkyl group containing 6 to 18 carbon atoms; $R_3$ is a hydrogen atom or a propenyl group; A is an unsubstituted or substituted alkylene group of 2 to 4 carbon atoms; n is an integer of 1 to 200; M means an alkali metal, an ammonium ion or an alkanolamine residue.

1 Claim, 1 Drawing Sheet

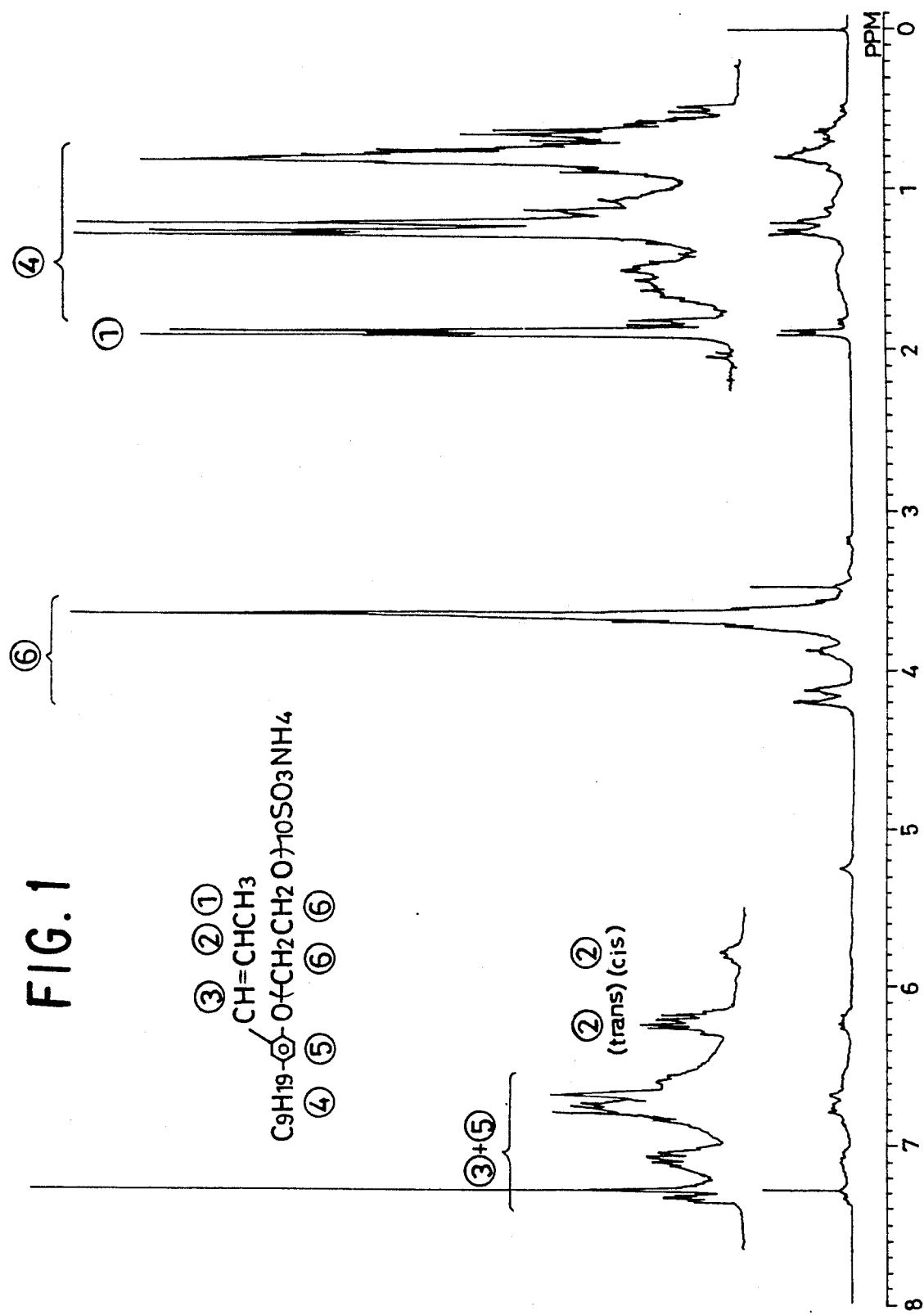

SURFACTANT

This application is a continuation of application Ser. No. 07/715,946 filed Jun. 14, 1991, now abandoned.

BACKGROUND OF THE INVENTION

The present invention relates to a surfactant.

Surfactants are generally possessed of a diversity of activities such as emulsifying, dispersing, detergent, wetting, foaming and other activities and as such have been utilized in almost all fields of modern industry such as paper, rubber, plastics, metal, paints, pigments and even civil engineering. Recently, particularly active attempts have been made to utilize surfactants for improving the performance of many end products but several concomitant drawbacks of surfactants have also come to be recognized in the course of such development endeavors.

Taking paints, printing inks, adhesives and pressure-sensitive adhesives as examples, surfactants are indispensable for the manufacture or stabilization of these products or in terms of processability. However, after such products have once been used for coating, printing, adhesion or pressure bonding, the surfactants are no longer necessary. Rather, if they remain in the products, surfactants tend to adversely affect the resistance of the film, print or adhesive layer to water and oil in many instances.

Reduction of the level of addition of surfactants or increase of the molecular weight of surfactants have been the common approaches taken these days to overcome the problems but no satisfactory solutions have been found as yet in terms of product stability and workability.

Meanwhile, as surfactants for use as emulsifiers for emulsion polymerization, anionic surfactants such as sodium dodecylbenzenesulfonate and nonionic surfactants such as polyoxyethylene nonylphenyl ether are known. However, the film of a polymer emulsion prepared using such an emulsifier has the drawbacks of poor resistance to water and poor bond strength because the emulsifier remains in free form in the polymer film.

To obviate these problems, several reactive emulsifiers containing copolymerizable unsaturated groups have been proposed.

For example, anionic reactive surfactants have been disclosed in Japanese Patent Publication No. 46-12472, Japanese Kokai Patent Publication No. 54-144317, Japanese Patent Publication No. 46-34894, Japanese Patent Publication No. 56-29657, Japanese Kokai Patent Publication No. 51-30285, Japanese Patent Publication No. 49-46291, and Japanese Kokai Patent Publication No. 56-127697, while nonionic reactive surfactants have been described in Japanese Kokai Patent Publication No. 56-28208 and No. 50-98484, among others, and emulsion polymerization of various monomers using these emulsifiers has been attempted.

Generally speaking, reactive emulsifiers containing an acryl or methacryl group as the copolymerizable unsaturated group are well copolymerizable with various monomers but are unsatisfactory in terms of the stability of emulsion polymerization reaction, giving rise to gels in the course of polymerization to produce coarse emulsion grains, and/or tend to give an emulsion poor in storage stability.

Reactive emulsifiers containing an allyl group as said copolymerizable unsaturated group have also been described in Japanese Kokai Patent Publication No. 62-100502, No. 62-221431 and No. 63-23725, among others, but these emulsifiers are often poor in copolymerizability with monomers and the polymer films molded from emulsions obtainable with such emulsifiers are not fully satisfactory in water resistance and in bond strength.

SUMMARY OF THE INVENTION

It is an object of the present invention to provide a surfactant which acts as a surfactant in the course of manufacture, storage or processing of products such as paints, printing inks, adhesives, pressure-sensitive adhesives or the like but terminates its function as a surfactant in due course thereafter.

It is a further object of the present invention to provide a surfactant which, when used as an emulsifier for emulsion polymerization, insures good stability of emulsion polymerization and marked improvements in the water resistance and bonding characteristic of the polymer film obtainable from the resulting polymer emulsion.

The surfactant of the present invention is a compound of the following general formula (I)

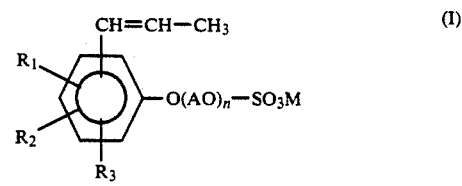

wherein $R_1$ is an alkyl, alkenyl or aralkyl group containing 6 to 18 carbon atoms; $R_2$ is a hydrogen atom or an alkyl, alkenyl or aralkyl group containing 6 to 18 carbon atoms; $R_3$ is a hydrogen atom or a propenyl group; A is an unsubstituted or substituted alkylene group of 2 to 4 carbon atoms; n is an integer of 1 to 200; M means an alkali metal, an ammonium ion or an alkanolamine residue.

BRIEF DESCRIPTION OF THE DRAWING

FIG. 1 is an NMR spectrum of a surfactant of the present invention.

DETAILED DESCRIPTION OF THE PREFERRED EMBODIMENTS

In the compound of general formula (I) which constitutes the surfactant of the present invention, the substituent group $R_1$ is an alkyl, alkenyl or aralkyl group containing 6 to 18 carbon atoms. The alkyl group includes, among others, hexyl, heptyl, octyl, nonyl, decyl, undecyl, dodecyl, tridecyl, tetradecyl, pentadecyl, hexadecyl, heptadecyl and octadecyl.

The alkenyl group includes, among others, hexenyl, heptenyl, octenyl, nonenyl, decenyl, undecenyl, dodecenyl, tridecenyl, tetradecenyl, pentadecenyl, hexadecenyl, heptadecenyl and octadecenyl.

The aralkyl group includes, among others, styryl, benzyl and cumyl.

The above alkyl, alkenyl and aralkyl groups may be mixedly present in the compound of general formula (I).

The substituent group $R_2$ is a hydrogen atom or an alkyl, alkenyl or aralkyl group containing 6 to 18 carbon atoms. This alkyl group includes, among others, hexyl, heptyl, octyl, nonyl, decyl, undecyl, dodecyl, tridecyl, tetradecyl, pentadecyl, hexadecyl, heptadecyl and octadecyl. These groups may be mixedly present.

The alkenyl group includes, among others, hexenyl, heptenyl, octenyl, nonenyl, decenyl, undecenyl, dodecenyl, tridecenyl, tetradecenyl, pentadecenyl, hexadecenyl, heptadecenyl and octadecenyl.

The aralkyl group includes, among others, styryl, benzyl and cumyl.

The above alkyl, alkenyl and aralkyl groups may occur mixedly in the compound of general formula (I).

The propenyl group may occur as trans-and cis-isomers. For the purposes of the present invention, these isomers may be used independently or as a mixture, although the trans-configuration is preferred.

The symbol A means an unsubstituted or substituted alkylene group of 2 to 4 carbon atoms. Thus, it may for example be ethylene, propylene, butylene or isobutylene as such, a homo-, block or random polymer thereof, or a mixture thereof. The degree of polymerization, n, is an integer of 1 to 200 and preferably of 2 to 100.

The conditions of the reaction for producing the surfactant of the present invention are not critical. For example, the surfactant of the present invention can be produced by adding an alkylene oxide such as ethylene oxide (EO) or propylene oxide (PO) to an alkylated propenyl phenol in the usual manner sulfating the addict with a sulfating agent such as sulfuric acid, sulfamic acid, chlorosulfonic acid or the like, if required followed by neutralizing with an alkaline substance.

The surfactant of the invention, when used in a paint, printing ink, adhesive or pressure-sensitive adhesive, acts as a surfactant in the course of manufacture, storage or even processing thereof and, then, ceases to function as a surfactant in due course thereafter.

Furthermore, the surfactant of the invention can be used as an emulsifier for emulsion polymerization, a dispersing agent for suspension polymerization, a dispersing agent for dyes and pigments, an emulsifier for waxes, a finishing agent for fibers, an emulsifier-dispersant for agrochemicals, an antistatic agent for synthetic resin and so on. In these and other applications, the aforesaid adverse effect of a residual surfactant can be drastically reduced.

As monomers which can be emulsion-polymerized using the surfactant of the invention as an emulsifier, there may be reckoned acrylic monomers such as acrylic acid, methyl acrylate, butyl acrylate, 2-ethylhexyl acrylate, methyl methacrylate, acrylonitrile, acrylamide, hydroxyethyl acrylate, etc., aromatic monomers such as styrene, divinylbenzene, etc., vinyl ester monomers such as vinyl acetate, halogenated olefinic monomers such as vinyl chloride, vinylidene chloride, etc.; conjugated diolefin monomers such as butadiene, isoprene, chloroprene, etc., as well as ethylene, maleic anhydride, methyl maleate, and so on.

The surfactant of the invention can be used in the emulsion polymerization of one or more of said monomers.

Any of the common polymerization initiators can be used in emulsion polymerization reactions employing the surfactant of the invention. Thus, for example, hydrogen peroxide, potassium persulfate, azobisisobutyronitrile, benzoyl peroxide, etc. can be utilized.

The polymerization accelerator may for example be sodium hydrosulfite or ferrous ammonium sulfate.

The proportion of the surfactant of the present invention is generally 0.1 to 20 weight percent, preferably 0.2 to 5.0 weight percent, based on the total monomer. If desired, other emulsifiers or protective colloids may be used in conjunction.

Since the surfactant of the present invention contains a propenyl group in the hydrophobic moiety of its molecule, it is highly copolymerizable with polymerizable monomers, particularly vinyl monomers, and as such is readily incorporated in the polymer structure. Therefore, it acts effectively as a reactive emulsifier of the copolymerization type, featuring a marked decrease in the residual amount of free emulsifier in the polymer film formed from the emulsion, thus contributing greatly to the water resistance and bonding performance of the film. In addition, the surfactant of the invention brings forth marked improvements in the stability of emulsion polymerization and the foaming potential and mechanical stability of the polymer emulsion.

The polymer emulsion made available by addition of the surfactant of the present invention can be applied, as an adhesive, coating agent, impregnation assisting agent or the like, to wood, metal, paper, cloth, concrete and other substrate materials.

The following examples and comparative examples are intended to illustrate the invention in further detail and should by no means be construed as defining the metes and bounds of the invention. It should also be understood that, in the following description, all percents (%) and parts are by weight.

EXAMPLE 1

In an autoclave, 260 g (1 mole) of nonylpropenylphenol was reacted with 440 g (10 moles) of ethylene oxide in the presence of potassium hydroxide as catalyst at a pressure of 1.5 kg/cm$^2$ and a temperature of 130° C. to prepare a nonylpropenylphenol-ethylene oxide (10 moles) adduct.

Then, a reactor equipped with a stirrer and thermometer was charged with 350 g (0.5 mole) of the above ethylene oxide adduct and 58.2 g (0.6 mole) of sulfamic acid and the sulfation reaction was conducted at 120° C. with stirring for 1 hour. The reaction mixture was filtered to remove the unreacted sulfamic acid and the residual composition (surfactant (A) of the invention) was analyzed by NMR spectrometry to confirm the presence of the propenyl radical (FIG. 1). The NMR parameter settings were as follows.

Nucleus: $^1$H
Resonance frequency: 270 MHz
Solvent: deuteriochloroform
Temperature: room temperature
Reference standard: TMS
Pulse: 45° pulse The addition reaction using 2,200 g (50 moles) of ethylene oxide and the subsequent sulfation reaction were carried out in the same manner as above to give a nonylpropenylphenol-ethylene oxide (50 moles) adduct sulfate ammonium salt, which was designated, as surfactant (B).

EXAMPLE 2

In an autoclave, 342 g (1 mole) of distyrylpropenylphenol was reacted first with 580 g (10 moles) of propylene oxide and then with 1,320 g (30 moles) of ethylene oxide in the presence of potassium hydroxide as the catalyst at a pressure of 1.5 kg/cm$^2$ and a temperature of 130° C. to give distyrylpropenylphenolpropylene oxide (10 moles)/ethylene oxide (30 moles) adduct. Then, a reactor equipped with a stirrer, thermometer and N₂ inlet piping was charged with 1,121 g (0.5 mole) of the above adduct, followed by dropwise addition of 58.3 g (0.5 mole) of chlorosulfonic acid at 10°–30° C. over a period of one hour in a nitrogen gas stream. The reaction mixture was ripened for one hour and then neutralized with an aqueous solution of sodium hydroxide. This composition was designated as surfactant (C).

EXAMPLE 3

Surfactants (D) through (G), shown in Table 1, were prepared as in Examples 1 and 2.

TABLE 1

| | Surfactant |
|---|---|
| (D) | Octyldipropenylphenol-ethylene oxide (10 moles) adduct sulfate ammonium salt |
| (E) | Octyldipropenylphenol-ethylene oxide (100 moles) adduct sulfate ammonium salt |
| (F) | Dodecylpropenylphenol-ethylene oxide (20 moles)/propylene oxide (10 moles) random adduct sulfate sodium salt |
| (G) | Dodecylpropenylphenol-butylene oxide (4 moles)/ethylene oxide (30 moles) block adduct sulfate sodium salt |

EXAMPLE 4

Each of the surfactants (A) through (G) of the invention as prepared in Examples 1, 2 and 3 was dissolved in water at a final concentration 0.1% and the surface tension of the solution was measured by the Traube method. As controls, the surface tensions of similar solutions of the conventional surfactants were also measured. The results are shown in Table 2.

TABLE 2

| Surfactant | Surface tension 0.1%, 25° C. (dyne/cm) |
|---|---|
| The invention | |
| Surfactant (A) | 40 |
| Surfactant (B) | 53 |
| Surfactant (C) | 44 |
| Surfactant (D) | 37 |
| Surfactant (E) | 58 |
| Surfactant (F) | 42 |
| Surfactant (G) | 45 |
| Control | |
| Sodium dodecylbenzenesulfonate | 36 |
| Nonylphenol-EO (8 moles) adduct sulfate ammonium salt | 40 |
| Nonylallylphenol-EO (40 moles) adduct sulfate ammonium salt | 50 |

EXAMPLE 5

Using each of the surfactants (A), (C) and (F) of the invention as obtained in Examples 1, 2 and 3, the carbon black dispersing power and kerosene emulsifying power were determined. As controls, the corresponding powers of the conventional surfactants were also determined. The results are shown in Table 3.

The methods for determination are as follows. Dispersing power: A common-stoppered 100 ml measuring cylinder was charged with 1 g of the test surfactant, 10 g of carbon black and a sufficient quantity of water to make 100 ml. The measuring cylinder was shaken 100 times in a minute and, then, allowed to stand at 25° C. for 1 hour. Thereafter, 30 ml of the top layer of the suspension was withdrawn and filtered through a glass filter. The residue was dried at 105° C. and weighed.

The % dispersing power was calculated by means of the following equation.

$$\text{Dispersing power (\%)} = \frac{\text{Weight of residue (g)}}{3 \text{ (g)}} \times 100$$

Emulsifying power: A graduated common-stopped test tube of 20 ml capacity was charged with 5 ml of a 0.5% aqueous solution of the test surfactant and 5 ml of kerosene. After the tube was shaken 100 times in a minute, it was allowed to stand at 25° C. for one hour. Thereafter, the volume (ml) of the emulsion layer was measured and the % emulsifying power was calculated by means of the following equation.

$$\text{Emulsifying power (\%)} = \frac{\text{Emulsion layer (ml)}}{10 \text{ (ml)}} \times 100$$

TABLE 3

| Surfactant | Dispersing power (%) | Emulsifying power (%) |
|---|---|---|
| The invention | | |
| Surfactant (A) | 85 | 98 |
| Surfactant (C) | 80 | 80 |
| Surfactant (F) | 96 | 70 |
| Control | | |
| Nonylphenol-EO (8 moles) adduct sulfate ammonium salt | 80 | 60 |
| Nonylallylphenol-EO (40 moles) adduct sulfate ammonium salt | 70 | 50 |

EXAMPLE 6

A polypropylene nonwoven fabric (2.5 cm × 10 cm) was immersed in a 1% aqueous solution of each test surfactant (Table 4) for one minute and, then, taken out and dried in a hot air current at 120° C. for 30 minutes.

The nonwoven fabric treated as above was suspended over a 100 ml beaker containing 50 ml of water, with a lower 1 cm portion of the fabric being immersed in the water. After 5 minutes, the height of water penetration (height from the water level) was measured (the baseline value before laundering).

For testing the laundering resistance, the surfactant-treated and dried nonwoven fabric was washed in running water for one minute and, after drying, subjected to the same water penetration test as above (the value after laundering).

The values before and after laundering are shown in Table 4.

TABLE 4

| Surfactant | Before laundering (mm) | After laundering (mm) |
|---|---|---|
| The invention | | |
| Surfactant (A) | 15 | 14 |
| Surfactant (D) | 18 | 16 |
| Surfactant (E) | 16 | 15 |
| Control | | |
| Nonylphenol-EO (8 moles) adduct sulfate ammonium salt | 15 | 2 |
| Nonylallylphenol-EO (40 moles) adduct sulfate ammonium salt | 12 | 10 |

EXAMPLE 7

To 300 g of water were added 30 g of polyvinyl alcohol with a saponification degree of 88 mole % and a viscosity average polymerization degree of 1,700 and 5 g of the surfactant shown in Table 5, followed by stirring under warming. To the resulting solution was added 240 g of vinyl acetate monomer dropwise, and using 1 g of ammonium persulfate as an initiator, the emulsion polymerization reaction was carried out under conditions to give a polymer emulsion.

As a film-forming aid, 30 g of dioctyl phthalate was added to the emulsion and the adhesive power of the composition was measured. The results are shown in Table 5.

TABLE 5

| Surfactant | Dry*1 adhesive power (kg/cm²) | Water-*2 resistant adhesive power (kg/cm²) |
| --- | --- | --- |
| The invention | | |
| Surfactant (B) | 200 | 150 |
| Surfactant (D) | 230 | 180 |
| Surfactant (G) | 210 | 160 |
| Control | | |
| Sodium dodecyl-benzenesulfonate | 92 | 10 |
| Nonylallylphenol-EO (40 moles) adduct sulfate ammonium salt | 170 | 90 |
| Lauryl alcohol-EO (20 moles) adduct | 120 | 35 |

*1: The compressive shear adhesive strength of birch/birch testpieces was measured in accordance with JIS-K 6804.
*2: The above testpieces were immersed in water at 30° C. for 3 hours and the compressive shear adhesive strength was then measured in the same manner as above.

EXAMPLE 8

A reactor equipped with a stirrer, reflux condenser, thermometer and drip funnel was charged with 294 g of deionized water and 6 g of the test surfactant (Table 6) and the internal temperature of the reactor was inceased to 80° C.

After the dissolved oxygen was removed by nitrogen gas purging, 20 g of ethyl acrylate and 0.5 g of ammonium persulfate were added for preliminary polymerization and starting 10 minutes after the beginning of polymerization, ethyl acrylate was added dropwise over a period of 3 hours for further polymerization to prepare a polymer emulsion.

The stability of the emulsion polymerization reaction, the mechanical stability of the product emulsion, foaming power and the water resistance test data on the polymer film obtained from the emulsion are shown in Table 6.

As controls, the conventional emulsions were also tested for the same parameters.

TABLE 6

| Surfactant | Stability*3 of polymerization (%) | Me-*4 chanical stability (%) | Foam-*5 ing power (ml) | Water-*6 resistance (hrs) |
| --- | --- | --- | --- | --- |
| The invention | | | | |
| Surfactant (A) | 0.06 | 0.04 | 0 | ≧300 |
| Surfactant (B) | 0.09 | 0.05 | 2 | 200 |
| Surfactant (C) | 0.12 | 0.12 | 0 | ≧300 |
| Surfactant (D) | 0.07 | 0.02 | 0 | 200 |
| Surfactant (E) | 0.20 | 0.06 | 4 | 180 |
| Surfactant (F) | 0.14 | 0.08 | 0 | ≧300 |
| Surfactant (G) | 0.28 | 0.10 | 3 | 250 |
| Control | | | | |
| Nonylphenol-EO (40 moles) adduct | 5.5 | 3.2 | 40 | 4 |
| Sodium dodecyl-benzene-sulfonate | 2.8 | 2.6 | 70 | 2 |

*3: The test emulsion was filtered through a #150 wire-mesh sieve and the residue was rinsed with water and dried. The weight of the dried solid residue was expressed in percentage based on the weight of monomer charge.
*4: Using a Marlon tester, 50 g of the test emulsion was stirred at 1000 rpm under a load of 10 kg for 5 minutes and, then, filtered through a #150 wire-mesh sieve. The residue was rinsed with water and dried and the weight of the dried residue was expressed in percentage based on the solid content of the emulsion.
*5: The test emulsion was diluted two-fold with water and 30 ml of the dilution was put in a 100 ml Nessler tube. The tube was turned upside down 30 times and, then, allowed to stand upright for 5 minutes. The volume of the resulting foam was then measured.
*6: The test emulsion was cast on a glass plate to prepare a 0.5 mm thick film. This film was immersed in water and the duration of time till 4.5-point characters became no longer legible through the film was measured.

EXAMPLE 9

A mixed monomer emulsion was prepared by admixing 100 g of butyl acrylate, 100 g of styrene, 290 g of deionized water, 0.5 g of potassium persulfate and 10 g of the test surfactant (Table 7) and the dissolved oxygen was removed by nitrogen gas purging.

A reactor equipped with a stirrer, reflux condenser, thermometer and drip funnel was charged with 100 g of the above monomer emulsion and the polymerization reaction was conducted at a temperature of 80° C.

Then, the balance, 400.5 g, of the monomer emulsion was added dropwise over a period of 3 hours for further polymerization to prepare a polymer product emulsion.

The stability of the emulsion polymerization, the mechanical stability and foamability of the product emulsion and the water resistance and contact angle teat data on the polymer film obtained from the emulsion are shown in Table 7. The conventional emulsifiers were also tested for the same parameters.

TABLE 7

| Surfactant | Stability of polymerization (%) | Mechanical stability (%) | Foaming power (ml) | Water-resistance (hrs) | Contact angle (°) |
| --- | --- | --- | --- | --- | --- |
| The invention | | | | | |
| Surfactant (A) | 0.04 | 0.02 | 0 | ≧300 | 130 |
| Surfactant (C) | 0.08 | 0.10 | 0 | ≧300 | 120 |
| Control | | | | | |
| Oleyl alcohol-EO (15 moles) adduct | 8.3 | 4.5 | 32 | 10 | ≦5 |
| Sodium laurylsulfate | 1.2 | 3.6 | 60 | 6 | ≦5 |

EXAMPLE 10

A reactor equipped with a stirrer, reflux condenser, thermometer and drip funnel was charged with 250 g of deionized water and 5 g of the surfactant shown in Table 8 and the internal temperature of the reactor was increased to 80° C.

After the dissolved oxygen was removed by nitrogen gas purging, a 20 g portion of a monomer mixture consisting of 125 g of butyl acrylate and 125 g of methyl methacrylate and 0.5 g of ammonium persulfate was added for preliminary polymerization. Starting 10 minutes after the beginning of polymerization, the balance of the monomer mixture was added dropwise over a period of 3 hours for additional polymerization to give a polymer emulsion.

As controls, polymer emulsions were prepared using the reactive emulsifiers shown in Table 8 in the same manner.

The stability of the emulsion polymerization reaction, the unreacted emulsifier content of the resulting emulsion and the contact angle and adhesion test data on the polymer film obtained from the emulsion are shown in Table 8.

TABLE 8

|  | Stability of polymerization (%) | Un-*10 reacted emulsifier (%) | Contact angle (°) | Adhe-*11 sive power (g/cm) |
| --- | --- | --- | --- | --- |
| The invention |  |  |  |  |
| Surfactant (A) | 0.08 | 3 | 145 | 750 |
| Surfactant (D) | 0.04 | 4 | 115 | 820 |
| Control |  |  |  |  |
| Reactive emulsifier (1)*7 | 0.4 | 15 | 80 | 400 |
| Reactive emulsifier (2)*8 | 58.6 | 10 | —*12 | —*12 |
| Reactive emulsifier (3)*9 | 4.3 | 47 | ≦5 | 280 |

*7 Octylallylphenol-ethylene oxide (30 moles) adduct sulfate sodium salt
*8 Lauryl alcohol-ethylene oxide (15 moles) adduct acrylate ester
*9 1-Nonylphenoxypolyoxyethylene(EO 20 moles adduct)-2-hydroxy-3-allyloxypropane sulfate ammonium salt
*10: The product polymer emulsion was dissolved in dioxane and poured in water for reprecipitation of the polymer and the emulsifer dissolved in the aqueous phase was determined by high performance liquid chromatography (HPLC).
*11: A polymer film reinforced with a 0.5 mm thick fabric was prepared on a glass sheet and a 180° peeling strength was measured at 25° C.
*12: No polymer emulsion was obtained. Therefore, no measurement could be made.

What is claimed is:

1. A compound of the following general formula (I)

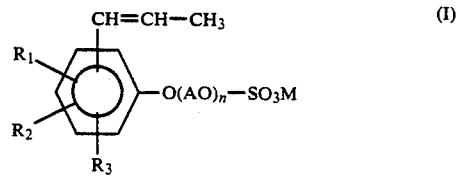

wherein $R_1$ is an alkyl, alkenyl or aralkyl group containing 6 to 18 carbon atoms; $R_2$ is a hydrogen atom or an alkyl, alkenyl or aralkyl group containing 6 to 18 carbon atoms; $R_3$ is a hydrogen atom or a propenyl group; A is an alkylene group of 2 to 4 carbon atoms; n is an integer of 1 to 200; M is an alkali metal, an ammonium ion or an alkanolaminecation.

* * * * *